United States Patent [19]

Tsujimoto

[11] Patent Number: 5,367,536

[45] Date of Patent: Nov. 22, 1994

[54] PARALLEL TRANSMISSION OF TDMA SYNC AND DATA BURSTS BY ARTIFICIAL FREQUENCY SELECTIVE FADE AND DECISION FEEDBACK EQUALIZATION

[75] Inventor: Ichiro Tsujimoto, Tokyo, Japan

[73] Assignee: NEC Corporation, Japan

[21] Appl. No.: 109,681

[22] Filed: Aug. 20, 1993

[30] Foreign Application Priority Data

Aug. 21, 1992 [JP] Japan .................. 4-222712

[51] Int. Cl.$^5$ .................. H03C 5/00; H03D 5/00
[52] U.S. Cl. .................. 375/42; 375/14;
375/59; 375/75; 375/94; 375/112; 370/111;
332/103; 329/304
[58] Field of Search .................. 375/14, 94, 111–114,
375/59, 52, 53; 332/103, 167; 329/304, 356;
370/110.1–110.4, 111, 95.3, 100.1; 364/724.2;
375/67, 83, 86, 41, 75, 42; 364/724.2

[56] References Cited

U.S. PATENT DOCUMENTS

| | | | |
|---|---|---|---|
| 4,675,880 | 6/1987 | Dowarian | 375/54 |
| 4,852,090 | 7/1989 | Borth | 375/14 |
| 5,175,747 | 12/1992 | Murakami | 375/14 |
| 5,241,544 | 8/1993 | Jasper et al. | 375/14 |
| 5,267,265 | 11/1993 | Mizoguchi | 375/14 |
| 5,274,672 | 12/1993 | Weiss | 375/47 |

*Primary Examiner*—Tesfaldet Bocure
*Attorney, Agent, or Firm*—Ostrolenk, Faber, Gerb & Soffen

[57] ABSTRACT

A data burst is modulated on an IF carrier, and a spectral null is artificially created in the center frequency region of the spectrum of the modulated data burst by taking the difference between delayed and non-delayed versions of the IF data burst. A sync burst is modulated on the IF carrier so that its spectrum corresponds to the center frequency region of the data burst and superimposed on the IF data burst and transmitted. At a receive site, the IF sync burst is recovered by passing the superimposed IF signal through a bandpass filter having a passband corresponding to the spectrum of the IF sync burst and the IF carrier is recovered from the recovered sync burst. The sync burst at baseband frequency is recovered from the IF sync burst by a demodulator using the recovered carrier. Using the recovered carrier, a baseband sync burst and a baseband data burst having a spectral null are synchronously detected from the superimposed IF signal and fed into a decision feedback equalizer where the original data burst is recovered.

4 Claims, 1 Drawing Sheet

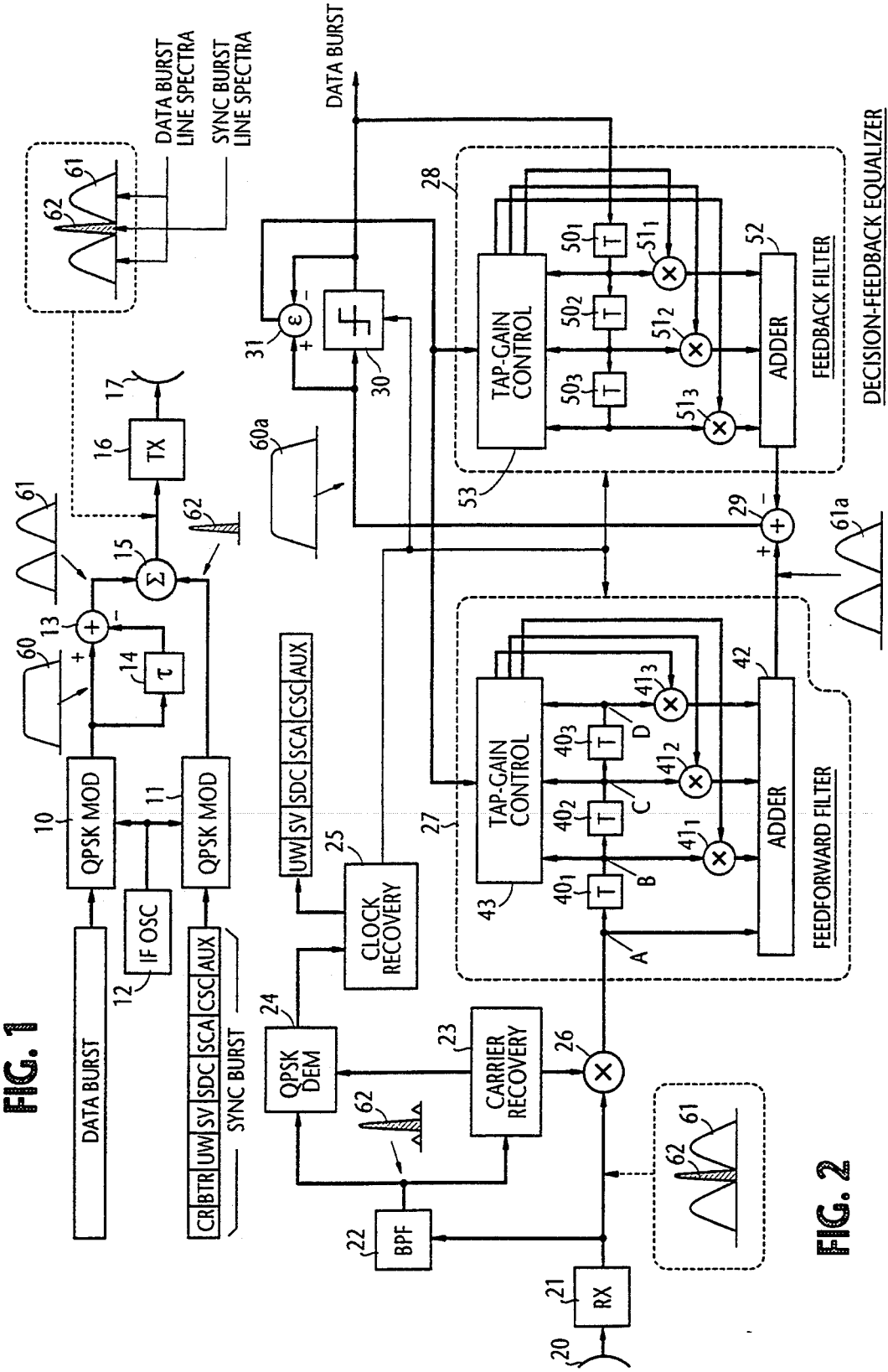

PARALLEL TRANSMISSION OF TDMA SYNC AND DATA BURSTS BY ARTIFICIAL FREQUENCY SELECTIVE FADE AND DECISION FEEDBACK EQUALIZATION

BACKGROUND OF THE INVENTION

1. Field of the Invention

The present invention relates generally to time division multiple access transmission systems, and more specifically to a TDMA transmission system capable of high speed transmission of data and synchronization bursts higher than the operating speed of TDMA preambleless modems.

2. Description of the Related Art

In TDMA transmission systems a succession of short-duration bursts emanating from a number of different stations is presented to a demodulator. Each burst has its own independent carrier phase and consequently rapid-acquisition modems are mandatory. To permit rapid acquisition of a burst, a synchronization burst is first transmitted, followed by an information-carrying data burst. The synchronization burst is usually structured so that it starts with a preamble followed by a unique word and various control bits. The preamble contains a series of bits that accentuates carrier and clock line spectra to assist lock-up at the receive site during the training interval. However, the transmission of a preamble represents a loss of transmission efficiency, and hence proposals have hitherto been made to implement preambleless modems. At the transmit site of the prior art preambleless TDMA system, a preambleless TDMA sync burst is time-division multiplexed with a data burst of duration much longer than the duration of the sync burst, subjected to quadrature phase shift keying (QPSK) modulation upon an intermediate frequency carrier, and then to frequency translation to a microwave region for transmission. At the receive site, the transmitted bursts are frequency converted to baseband frequency, and stored into a buffer. A carrier and bit timing recovery circuit, connected to the buffer, performs a fast Fourier transform process on the stored data burst and detects the transmitted carrier and bit timing from the data burst. Using the recovered carrier and bit timing clock, the stored baseband signal is read out of the buffer into a QPSK demodulator where the whole contents of the original data and sync bursts are recovered collectively using what is known as an "en-block demodulation technique" and separated from each other by a time-division demultiplexer.

However, a dramatic transmission-efficiency improvement cannot be achieved by the prior art preambleless TDMA transmission since the preamble does not accounts for a substantial portion of the sync burst. Additionally, the amount of delays introduced by the read/write operations and the en-block demodulation process cannot be ignored for high speed TDMA transmission.

SUMMARY OF THE INVENTION

It is therefore an object of the present invention to provide a TDMA transmission technique that allows high speed transmission of bursts by parallel transmission of synchronization bursts and data bursts. The TDMA communication system of this invention attains a high level of transmission efficiency and a minimum of processing delays, not attainable with the prior art preambleless TDMA transmission, with the artificial introduction of frequency selective fade at the transmit site of the system to allow parallel transmission of sync and data bursts and the use of a decision feedback equalizer at the receive site for extracting the data burst and compensating for the distortions caused by the frequency fade.

According to the present invention, there is provided a time division multiplex communication system having a transmitting station and a receiving station. The system comprises a first modulator at the transmitting station for modulating a baseband data burst upon an intermediate frequency carrier and producing an intermediate frequency data burst having a substantially flat spectrum. A frequency fade circuit is provided for causing the intermediate frequency data burst to produce a spectral null in the center frequency region of its spectrum. A second modulator provides modulation of a baseband synchronization burst upon the intermediate frequency carrier and producing an intermediate frequency synchronization burst having a spectral energy distribution in a frequency region corresponding to the center frequency region of the intermediate frequency data burst. The intermediate frequency data burst having the spectral null is superimposed with the intermediate frequency synchronization burst to produce an intermediate frequency combined burst signal. The combined burst signal is then transmitted by a radio transmitter from the transmitting station. The intermediate frequency combined burst signal from the transmitting station is received by a radio receiver at the receiving station and fed into a bandpass filter having a passband corresponding to the spectral null of the intermediate frequency data burst to recover the intermediate frequency synchronization burst. A carrier recovery circuit is connected to the bandpass filter to recover the intermediate frequency carrier from the recovered intermediate frequency synchronization burst. A demodulator is connected to the bandpass filter and the carrier recovery circuit for demodulating the intermediate frequency synchronization burst with the recovered carrier to recover the baseband synchronization burst. A synchronous detector is connected to the radio receiver and the carrier recovery circuit for operating on the intermediate frequency combined burst signal with the recovered intermediate frequency carrier and producing a combined burst signal containing a baseband synchronization burst and a baseband data burst having a spectral null. A decision feedback equalizer is connected to the synchronous detector for extracting the baseband data burst having the spectral null from the combined burst signal and eliminating an intersymbol interference from the extracted baseband data burst to recover the baseband data burst having a substantially flat spectrum.

More specifically, the baseband synchronization burst has the same length of time as the baseband data burst and contains a preamble for carrier and bit timing recovery, and the frequency fade circuit comprises a delay element for introducing a delay time to the intermediate frequency data burst from the first modulator, and a subtractor. The intermediate frequency data burst having the spectral null is produced by the subtractor by subtracting the output of the delay element from the output of the first modulator.

Preferably, the decision feedback equalizer comprises a feedforward filter comprising first delay-line taps for receiving the output signal of the synchronous detector and producing a succession of tap signals at the first delay-line taps, first tap-gain multipliers for operating on the tap signals, and a first adder for receiving the output signal of the synchronous detector as a reference input and the tap signals from the first tap-gain multipliers and producing a feedforward output signal as said extracted baseband data burst. A decision circuit is included for deriving a decision output signal from an equalized signal. A feedback filter is provided comprising second delay-line taps for receiving the decision output signal and producing a succession of tap signals at the second delay-line taps, second tap-gain multipliers for operating on the tap signals at the second delay-line taps, and a second adder for combining output signals from the second tap-gain multipliers to produce a feedback output signal which is combined with the feedforward signal to derive the equalized signal. A decision error associated with the decision circuit is detected and correlations between it and the tap signals at the first and second delay-line taps are detected for controlling the tap gains of the first and second tap-gain multipliers.

BRIEF DESCRIPTION OF THE DRAWINGS

The present invention will be described in further detail with reference to the accompanying drawings, in which:

FIG. 1 is a block diagram of a transmitting station of a TDMA communication system of the present invention; and FIG. 2 is a block diagram of a receiving station of the TDMA communication system of the present invention.

DETAILED DESCRIPTION

Referring now to FIG. 1, there is shown a transmitting station of a TDMA transmission system according to the present invention. The transmitting station comprises a quadrature phase shift keying (QPSK) modulators 10 and 11 and an intermediate-frequency oscillator 12. A transmit data burst is applied to the QPSK modulator 10 where it is modulated onto the IF quadrature carriers from oscillator 12 to produce a QPSK signal having a wide spectrum as indicated at 60 and applied to the inputs of a subtractor 13 via two paths, one coupling the non-delayed signal to one input of the subtractor and the other coupling a delayed version of the QPSK signal through a delay line 14 to the other input of the subtractor where it is subtracted from the non-delayed signal. The delay line 14 introduces a period $\tau$ to the QPSK signal. The period $\tau$ is so chosen that the delayed QPSK signal can be treated as if it were an interference signal propagated through a reflected, longer path from a transmitter and the direct signal is treated as if it were a desired, main signal propagated through a direct path from the transmitter. As a result, artificial interference occurs at the output of subtractor 13 in a manner similar to the interference that occurs as a result of multipath fading. This creates a notch (spectral null), or a "fade" at the center of the spectrum 60, producing a notched spectrum as indicated by numeral 61. This spectral null is equivalent to the frequency selective fade that occurs in two-wave multipath transmission.

On the other hand, a synchronization burst having the same duration as the data burst is generated and applied to the QPSK modulator 11 where it is modulated onto the quadrature carriers from oscillator 12. As illustrated in FIG. 1, the sync burst contains a preamble comprising carrier and bit timing recovery (CR, BTR) fields, a unique word (UW) for burst frame synchronization, a supervisory field (SV) and the various TDMA control fields (SDC, SCA, CSC, AUX). Because of the equality of burst duration to the higher bit-density data burst while the total number of bits contained in the sync burst is much smaller than that of the data burst, the sync burst of the present invention has a lower bit rate than the data burst, and hence the modulated sync burst has a narrower spectrum at the output of modulator 11 as indicated by numeral 62 than the spectrum of the data burst.

An adder, or multiplexer 15 is provided for multiplexing the outputs of subtractor 13 and QPSK modulator 11 in a manner similar to frequency division multiplexing. Thus, the narrow-band sync burst is combined with the data burst such that it occupies the center region of the data burst spectrum 61 where it is notched by the provision of the frequency fade circuit at the transmitter. The output of multiplexer 15 is converted to a radio frequency signal by a transmitter 16 and applied to an antenna 17 for transmission. In this way, the sync and data bursts are simultaneously transmitted.

At the receiving station of the TDMA transmission system, FIG. 2, the transmitted burst signal is received by antenna 20 and applied to a receiver 21 where it is converted to an intermediate frequency combined burst signal, producing the same spectral energy pattern as generated at the output of the multiplexer 15 at the transmitting station.

Since the sync burst has a narrower bandwidth than the data burst, it can be processed as a narrow band interference signal if the data burst is treated as a desired signal and the data burst can be processed as a wideband interference signal if the sync burst is treated as a desired signal.

The output of receiver 21 is connected to a bandpass filter 22 having a passband corresponding to the spectral energy 62 of the IF signal. Thus, the sync burst is extracted by bandpass filter 22. The extracted sync burst is applied to a carrier recovery circuit 23 and a OPSK demodulator 24. The transmitted carrier is recovered by carrier recovery circuit 23 from the carrier recovery field of the extracted sync burst and applied to as a local IF carrier to the QPSK demodulator 24 to demodulate the sync burst. A clock recovery circuit 25 is connected to the QPSK demodulator 24 to recover the transmitted clock timing from the bit timing recovery field of the extracted sync burst and deliver a sequence of bits following the bit timing recovery field.

The intermediate frequency signal from receiver 21 is applied to a complex multiplier, or synchronous detector 26 where the sync and data bursts at baseband frequency are synchronously detected by using the quadrature carriers from the carrier recovery circuit 23. The output of complex multiplier 26 is applied to a decision feedback equalizer where the narrow-band interference and the intersymbol interference introduced by the artificial frequency selective fade are eliminated. The decision feedback equalizer comprises a feedforward filter 27, a feedback filter 28, a subtractor 29, a decision circuit 30 and an error detector 31. The feedforward filter 27, feedback filter 28 and decision circuit 30 are connected to clock recovery circuit 25 to operate at the recovered bit timing.

More specifically, the feedforward filter 27 comprises a four-stage shift register formed by a series of three delay-line units $40_1$, $40_2$ and $40_3$, each having a symbol delay time T, forming four taps; a first (or reference) tap A at the input of delay $40_1$, and second, third and fourth taps B, C and D at the outputs of delay units $40_1$, $40_2$ and $40_3$, respectively. The output of synchronous detector 26 is connected to the input end of the delay line to produce a succession of tap signals at the taps A, B, C and D.

The feedforward filter 27 exhibits a spectral response identical to that of the center frequency region of the notched spectral pattern 61. This is achieved by coupling the reference tap A direct to an adder 42, while coupling the taps B, C and D to complex multipliers $41_1$, $41_2$, and $41_3$ whose outputs are connected to adder 42. A tap-gain controller 43 is connected to the taps B, C and D and to the output of error detector 31 to produce tap-gain control signals by detecting the correlations between a decision error $\epsilon$ from the error detector 31 and the respective tap signals at the second, third and fourth delay taps. The tap-gain control signals are applied to the corresponding complex multipliers 41 for weighting the respective tap signals, and updated according to the least mean square (LMS) algorithm. As a result of establishing the reference input of the feedforward filter 27 direct from the output of synchronous detector 26, the baseband sync burst contained in the output of this synchronous detector is eliminated at the output of adder 42, producing a baseband data burst whose spectrum 61a has a spectral null in the center frequency region of the baseband frequency.

Since the artificial interference yields a two-wave multipath fade model and causes artificial fade distortion to occur in the data burst at the output of subtractor 13, the intersymbol interference caused by this fade can be removed by the feedback filter 28.

The feedback filter 28 is comprised by a three-stage shift register having delay units $50_1$, $50_2$ and $50_3$ with a delay time T for receiving a decision output (data burst) from the decision circuit 30 to produce a succession of tap signals. Complex multipliers $51_1$, $51_2$ and $51_3$ are connected respectively to the outputs of delay units $50_1$, $51_2$ and $51_3$ for weighting the respective tap signals with tap-gain control signals and supplying the weighed signals to an adder 52. These tap-gain control signals are derived by a tap-gain controller 53 which detects correlations between the decision error $\epsilon$ and the tap signals and updates the tap-gains according to the LMS algorithm.

An equalized data burst having a flat spectrum 60a at baseband frequencies is obtained at the output of subtractor 29 by subtracting the output of adder 52 from the output of adder 42. The decision circuit 30 receives the equalized data burst from subtractor 29, compares it with a predetermined decision threshold and produces a decision symbol sequence at one of four symbol values in the real and imaginary domains. This decision symbol sequence is delivered as a replica of the transmitted data burst to an external circuit, while it is reapplied to the feedback filter 28 for cancelling the intersymbol interference artificially introduced into the data burst at the transmitter.

Since the artificially introduced intersymbol interference can be considered as a delayed channel response caused by interference from a symbol sequence delayed by period $\tau$, while the tap signals of the feedback filter 28 are the decision symbol sequence corresponding to that delayed response, the intersymbol interference is completely cancelled by feedback filter 28.

The error detector 31 is connected across the input and output of the decision circuit 30 to detect an error introduced in the decision process and to update the tap-gain values of both feedforward and feedback filters. In addition to the cancellation of both sync burst interference and artificial fade distortion are eliminated, time-variant multipath fading distortions that naturally occur in the transmission route can also be cancelled by the decision feedback equalizer of this invention.

What is claimed is:

1. A time division multiplex communication system having a transmitting station and a receiving station, comprising:

first modulator means at said transmitting station for modulating a baseband data burst upon an intermediate frequency carrier and producing an intermediate frequency data burst having a substantially flat spectrum;

frequency fade means for causing said intermediate frequency data burst to produce a spectral null in a center frequency region of the spectrum thereof;

second modulator means for modulating a baseband synchronization burst upon said carrier and producing an intermediate frequency synchronization burst having a spectral energy distribution in a frequency region corresponding to the center frequency region of said intermediate frequency data burst;

multiplexer means for combining the intermediate frequency data burst having said spectral null and said intermediate frequency synchronization burst and producing an intermediate frequency combined burst signal;

radio transmitter means for transmitting said intermediate frequency combined burst signal from said transmitting station;

radio receiver means at said receiving station for receiving the intermediate frequency combined burst signal from said transmitting station;

a bandpass filter having a passband corresponding to the spectral null of said intermediate frequency data burst, said bandpass filter being connected to said radio receiver means for recovering said intermediate frequency synchronization burst from the intermediate frequency combined burst signal;

carrier recovery means connected to said bandpass filter for recovering said intermediate frequency carrier from the intermediate frequency synchronization burst;

demodulator means connected to said bandpass filter and said carrier recovery means for demodulating said intermediate frequency synchronization burst with the recovered intermediate frequency carrier and recovering said baseband synchronization burst;

a synchronous detector connected to said radio receiver means and said carrier recovery means for operating on the intermediate frequency combined burst signal with said recovered intermediate frequency carrier and producing a baseband combined burst signal; and a decision feedback equalizer connected to the synchronous detector for extracting said baseband data burst having a spectral null from the baseband combined burst signal and eliminating an intersymbol interference from the extracted baseband data burst to recover said baseband data burst having a substantially flat spectrum.

2. A time division multiplex communication system as claimed in claim 1, wherein said baseband synchronization burst has the same length of time as said baseband data burst and contains a preamble for carrier and bit timing recovery.

3. A time division multiplex communication system as claimed in claim 1, wherein said frequency fade means comprises:

delay means for introducing a delay time to said intermediate frequency data burst from said first modulator means; and subtractor means for combining the output of the delay means with the output of the first modulator means and producing said intermediate frequency data burst having said spectral null.

4. A time division multiplex communication system as claimed in claim 1, wherein said decision feedback equalizer comprises:

a feedforward filter comprising a first tapped delay line for receiving the output signal of said synchronous detector and defining first delay-line taps for producing a succession of tap signals at said first delay-line taps, first tap-gain multipliers for operating on the tap signals at said first delay-line taps, and first summing means for receiving the output signal of said synchronous detector as a reference input and the tap signals from said first tap-gain multipliers and producing a feedforward output signal as said extracted baseband data burst;

decision means for deriving a decision output signal from an equalized signal;

a feedback filter for operating on the decision output signal from said decision means, the feedback filter comprising a second tapped delay line defining second delay-line taps for producing a succession of tap signals at said second delay-line taps, second tap-gain multipliers for operating on the tap signals at said second delay-line taps, and second summing means for combining output signals from said second tap-gain multipliers to produce a feedback output signal;

a decision error detector for detecting a decision error between the input and output of said decision means;

first tap-gain control means for detecting correlations between the tap signals at said first delay-line taps and said decision error for controlling tap gains of said first tap-gain multipliers with the detected correlations, respectively;

second tap-gain control means for detecting correlations between the tap signals at said second delay-line taps and said decision error for controlling tap gains of said tap-gain multipliers with the detected correlations, respectively; and a combiner for combining the feedforward output signal and the feedback output signal and producing a combined signal and supplying the combined signal to said decision means as said equalized signal.

* * * * *